United States Patent
Nola et al.

(10) Patent No.: US 9,975,500 B2
(45) Date of Patent: May 22, 2018

(54) ENGINE COVER APPLIQUE BACKING

(71) Applicant: FORD GLOBAL TECHNOLOGIES, LLC, Dearborn, MI (US)

(72) Inventors: Gary Nola, Saline, MI (US); Christopher W. Newman, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 73 days.

(21) Appl. No.: 15/252,717

(22) Filed: Aug. 31, 2016

(65) Prior Publication Data
US 2018/0056890 A1    Mar. 1, 2018

(51) Int. Cl.
*B60R 13/00*    (2006.01)

(52) U.S. Cl.
CPC ................... *B60R 13/005* (2013.01)

(58) Field of Classification Search
CPC ......... B60R 13/005; F02B 77/13; F02B 77/00
See application file for complete search history.

(56) References Cited

U.S. PATENT DOCUMENTS

2005/0132997 A1*  6/2005  Vargas .................... F02F 7/006
                                                              123/195 C

* cited by examiner

*Primary Examiner* — Jacob Amick
(74) *Attorney, Agent, or Firm* — Gregory P. Brown; MacMillan, Sobanski & Todd, LLC

(57) ABSTRACT

An apparatus includes an engine assembly and an engine cover. The engine cover includes at least one through hole extending from a top surface to a bottom surface. An appliqué is mounted on the engine cover. The appliqué includes at least one mounting post extending through the at least one through hole. A backing plate is disposed on a bottom surface of the engine cover receiving the at least one mounting post to secure the appliqué to the engine cover.

18 Claims, 4 Drawing Sheets

ENGINE COVER APPLIQUE BACKING

CROSS REFERENCE TO RELATED APPLICATIONS

Not Applicable.

STATEMENT REGARDING FEDERALLY SPONSORED RESEARCH

Not Applicable.

BACKGROUND OF INVENTION

The present invention relates to an appliqué for an engine cover.

The engine cover of a vehicle presents various challenges for vehicle engineers and designers in providing functionality, serviceability, and aesthetics in a relatively small space. Consideration must also be given to manufacturing and assembly costs in addition to weight, which ultimately impacts fuel economy, to deliver a competitive product. An engine cover is typically used in order to enhance the overall appearance of the engine compartment and to reduce the propagation of engine noise. Injection molded polymers are commonly used to fabricate an engine cover.

For soft engine covers, such covers must be appropriately supported in order to prevent damage or sagging from the engine compartment environment. Often, there are not sufficient locations to provide attachment points or resting location for soft engine covers to lie. One solution is to over-mold rigid plates within the foam to support the cover. This concept is both manufacturing limited and also expensive. While an appliqué or badge on top of the engine can provide some support, such support to reinforce the soft cover is limited based on the strategy of the design, size, and appearance of the cover. As a result, the appliqué may not provide a substantial area to properly support the entire soft engine cover.

SUMMARY OF INVENTION

In one aspect of the invention, the invention includes an appliqué that can be assembled to an engine cover foam body via a backing plate where the backing plate can function as not only a method for securing the appliqué to the engine cover, but as method for structurally supporting the engine cover, particularly if a soft engine cover is utilized. The appliqué is disposed on the top side of the engine cover and the backing plate is disposed on the bottom side of the cover. The backing plate provides a sufficient surface area to structurally support the engine cover. The appliqué includes posts that extend through the engine cover for securing the backing plate via fasteners. The fasteners used to the secure the appliqué to the engine cover may be integrally formed as part of the backing plate or may separate from the backing plate. Alternatively, the fasteners may be separate from the backing plate and affixed to the posts.

An embodiment contemplates an apparatus for a motor vehicle that includes an engine assembly. An engine cover substantially conceals at least a portion of the engine assembly. The engine cover includes at least one through hole extends from a top surface to a bottom surface. An appliqué is disposed on a top surface of the of the engine cover. The appliqué includes at least one mounting post. The at least one mounting post extends through the through holes of the engine cover. A backing plate is disposed on a bottom surface of the engine cover. The backing plate includes at least one through hole that aligns with the at least one through hole of the engine cover. The at least one through hole of the backing plate receives the at least one mounting post of the appliqué. A fastener is secured to the at least one mounting post on a bottom surface of the backing plate to secure the appliqué to the engine cover.

An embodiment contemplates an apparatus including an engine assembly and an engine cover including at least one through hole extending from a top surface to a bottom surface. An appliqué is mounted on the engine cover. The appliqué includes at least one mounting post extending through the at least one through hole. A backing plate is disposed on a bottom surface of the engine cover receiving the at least one mounting post to secure the appliqué to the engine cover.

DETAILED DESCRIPTION

Figure 1:
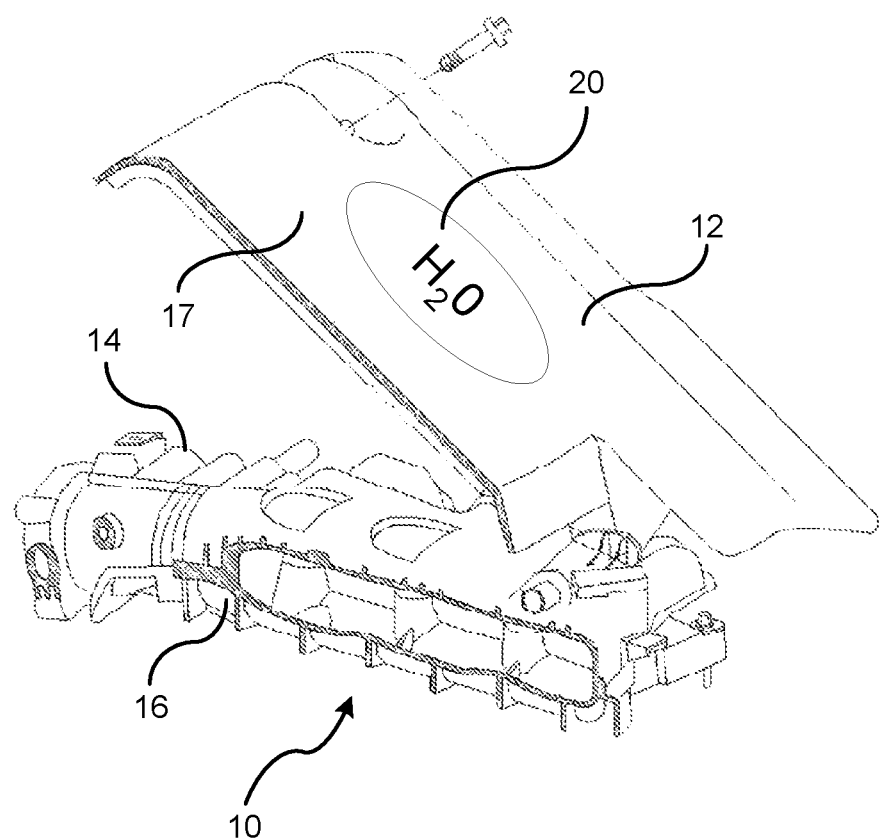
FIG. 1 is a perspective view of a partial engine with engine cover assembly.

There is shown in FIG. 1, an engine 10 supporting an engine cover 12. The engine 10 is a typical engine including an upper manifold 14 and a lower manifold 16. The engine cover 12 includes a shroud portion 17 to conceal at least a portion of the engine 10 including the upper manifold 14. The engine cover 12 includes a hinge portion to pivot away from the upper manifold 14 to provide access to the engine 10. It should be understood that the pivot-style attachment to the upper manifold 14 is only one way of attaching the engine cover 12 to the engine 10 and that other methods including non-pivoting attachments may be used without deviating from the scope of the invention.

The engine cover 12 may be a soft cover molded from materials including, but not limited to, foam, nylon, PVC, or polyurethane. The engine cover 12 may include various other details for accommodating features and accessories of the engine 10, such as an oil port and an oil dip stick.

The engine cover 12 further includes an appliqué 20. The appliqué is badge, decorate, design, or an artistic impression to the engine cover 12. For example, the appliqué 20 may include, but is not limited to, a letter, number, word, name, picture, or other type of impression that adds some type of decoration to the engine cover 12. The appliqué 20 is manufactured separately from the engine cover 12 and is affixed to the engine cover 12 by a method other than overmolding.

Figure 2:
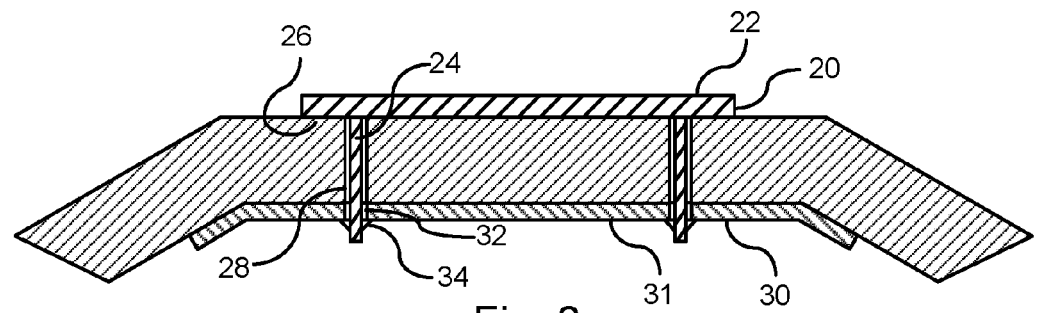
FIG. 2 is a cross-section view of the engine cover assembly.

FIG. 2 illustrates a cross-section view of the engine cover 12 and the appliqué 20. The engine cover 12 as shown in the FIG. 2 includes a substantially planar center section with angle end portions for covering the engine. While the engine cover 12, as illustrated in FIG. 2, is shown as symmetrical, it should be understood that the engine cover 12 may be symmetrical or non-symmetrical.

The appliqué 20 includes a substantially planar section with a design decal, embossed logo, or similar formed on a top layer surface 22. The appliqué 20 further includes a respective set of posts 24 integrally to a bottom side surface 26 of the appliqué 20. Alternatively, the sets of posts 24 may be attached to the bottom side surface by another technique including, but not limited to, press-fit connection, threaded connection, or weld joint. In addition, although only two posts are shown in FIG. 2, more or less posts may be used for attaching the appliqué than what is depicted. The engine cover 12 includes a set of through holes 28 for receiving the set of posts 24 therethrough.

A backing plate 30 is positioned on the bottom side surface 31 of the engine cover foam body 12. The backing plate 30 is preferably contoured to a same contour as the bottom side surface 31. The backing plate 30 includes through holes 32 that are aligned with the through holes 28 of the engine cover foam body 12 for receiving the set of posts 24 therethrough. The backing plate 30 supports a substantial surface area of the underside of the engine cover foam body 12 particularly with respect to soft engine covers to provide structural support to the engine cover foam body 12 while functioning as an attachment for the appliqué 20. The backing plate 30 may be made of a material that includes, but is not limited to, aluminum, steel, Nylon, or nylon-glass filled composite (e.g., PA6 nylon) for providing structural support. The selected material should be capable of withstanding engine temperatures, water, moisture, as well as chemicals used by the engine that the backing plate may come into contact with.

Fasteners 34 secure each of the sets of posts to the backing plate 30. The fasteners 34 are preferably palnuts; however, other types of fasteners may be used including, but not limited to, nuts, wingnuts, and c-clips. If a palnut is used, the sets of posts 24 may include lacerations or scuff marks to assist the palnut in enhancing the grasp of the barbs of the palnut to the sets of posts 24.

Figure 3:
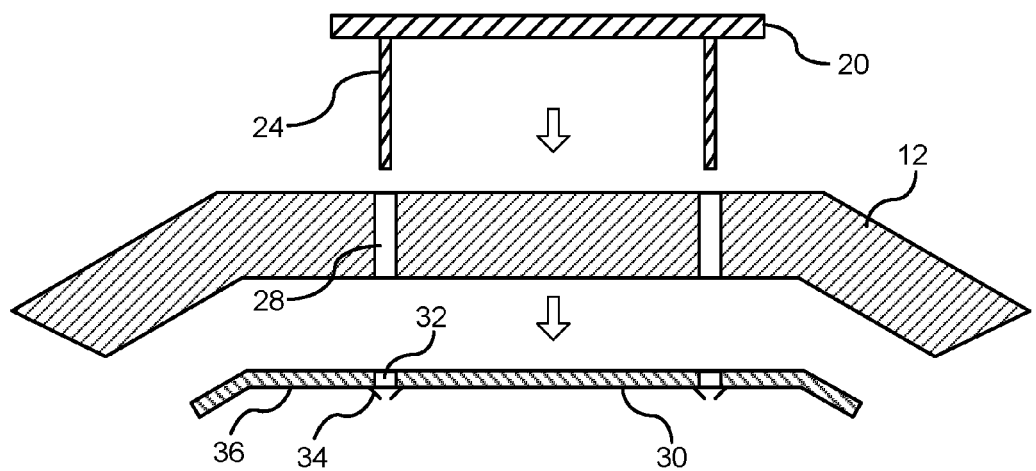
FIG. 3 is an exploded diagram of the engine cover assembly using discrete fasteners.

FIG. 3 illustrates an exploded diagram of the assembly. The sets of posts 24 of the appliqué 20 extend through the through holes 28 of the engine cover foam body 12 and the through holes 32 of the back plate 30. As shown in FIG. 3, the fasteners 34 are integrally formed to a bottom side surface 36 of the backing plate 30.

Figure 4:
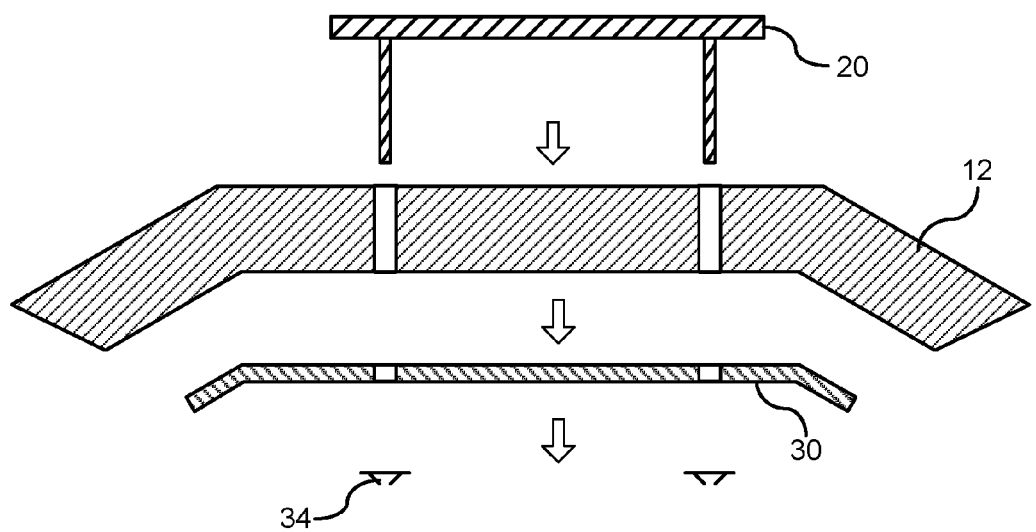
FIG. 4 is an exploded diagram of the engine cover assembly integrated fasteners.

FIG. 4 illustrates a similar configuration as FIG. 3 except that the fasteners 34 are not integrally formed to the backing plate 30. Rather the fasteners are discrete and are either pushed on to the sets of posts 24 after the sets of posts 24 are inserted through the through holes or may be fixed to the sets of posts 24 by other techniques (e.g., threaded).

Figure 5:
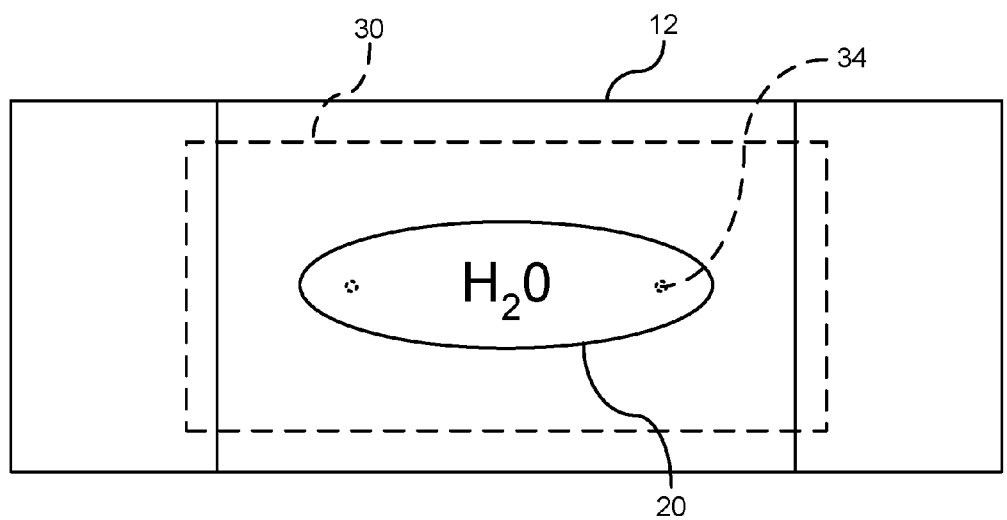
FIG. 5 is a top view of the engine cover assembly.

FIG. 5 illustrates a top view of the engine cover foam body 12 illustrating the appliqué 20 affixed to the engine cover foam body 12. The sets of posts 24 disposed on the bottom side surface of the appliqué 20 are shown by the hidden lines in FIG. 5. Also shown as evidenced by the hidden lines is the backing plate 30. The appliqué 20 as illustrated in FIG. 5 includes an emblem with $H_2O$ shown therein. The appliqué 20 can be any letter, number, word, or other artistic impression.

Figure 6:
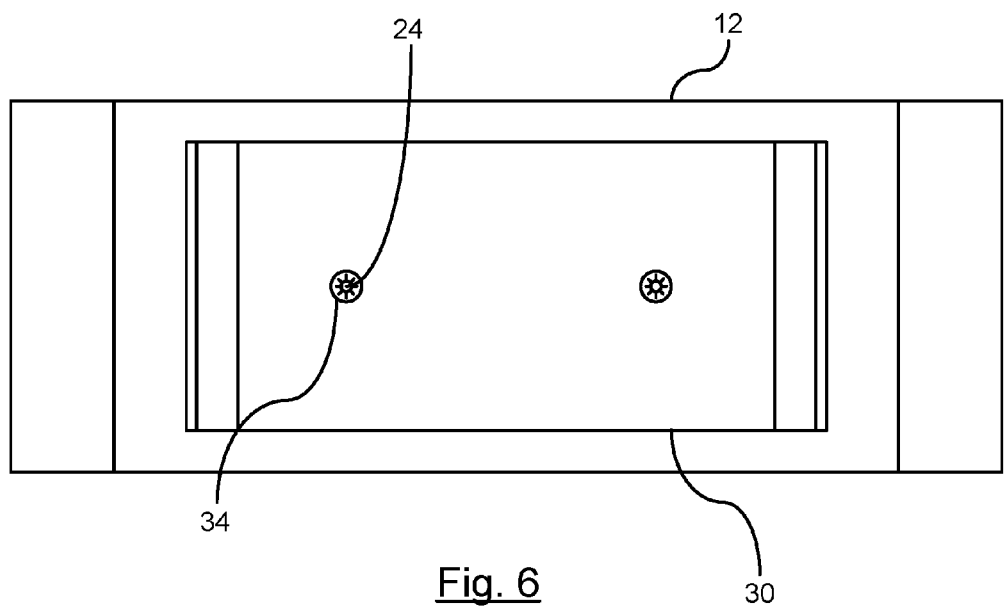
FIG. 6 is a bottom view of the engine cover assembly

FIG. 6 illustrates the bottom side surface 31 of the engine cover foam body 12. The backing plate 30 is shown disposed on the bottom side surface 31 of the engine cover foam body 12. The backing plate 30 need not extend to the entire perimeter of the engine cover foam body 12; rather, the backing plate 30 should cover a sufficient surface area to support the engine cover foam body 12 particularly if a soft engine cover is utilized. The sets of posts 24 extend through the through holes of the backing plate 30 and are secured by the fasteners 34.

Figure 7:
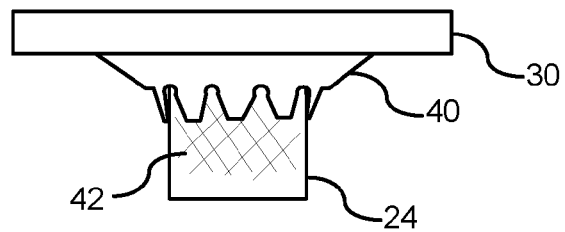
FIG. 7 illustrates a retention mechanism using a palnut-type fastener.

FIG. 7 illustrates a side view of a palnut 40 to retain the backing plate 30 to the sets of posts 24. The sets of posts 24 may include lacerations 42 or may include threads to assist the palnut 40 in adhering to the sets of posts 24.

Figure 8:
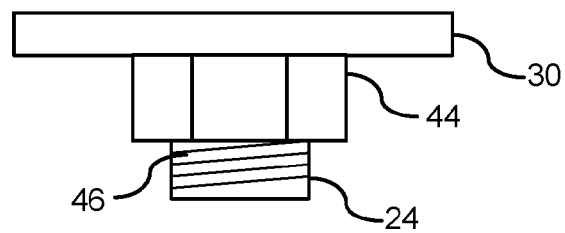
FIG. 8 illustrates a retention mechanism using a nut-type fastener.

FIG. 8 illustrates a side view of a nut 44 to retain the backing plate 30 to the sets of posts 24. The sets of posts 24 include threads 46 to receive the nut 44 for securing the backing plate 30 to the sets of posts 24.

Figure 9:
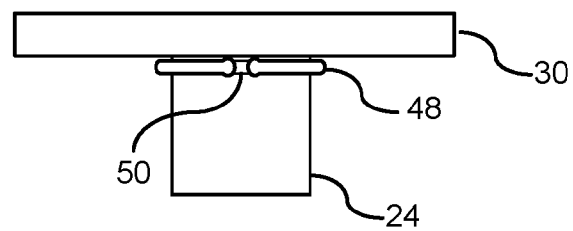
FIG. 9 illustrates a retention mechanism using a c-clip type fastener.

FIG. 9 illustrates a side view of a c-clip 48 used to retain the backing plate 30 to the sets of posts 24. The sets of posts 24 include a groove 50 to receive the c-clip 48 for securing the backing plate 30 to the sets of posts 24.

While certain embodiments of the present invention have been described in detail, those familiar with the art to which this invention relates will recognize various alternative designs and embodiments for practicing the invention as defined by the following claims.

What is claimed is:

1. An apparatus for a motor vehicle comprising:
   an engine assembly;
   an engine cover substantially concealing at least a portion of the engine assembly, the engine cover including at least one through hole extending from a top surface to a bottom surface;
   an appliqué disposed on a top surface of the of the engine cover, the appliqué including at least one mounting post, the at least one mounting post extending through the at least one through hole of the engine cover;
   a backing plate disposed on a bottom surface of the engine cover, the backing plate including at least one through hole that aligns with the at least one through hole of the engine cover, the at least one through hole of the backing plate receiving the at least one mounting post of the appliqué; and
   a fastener secured to the at least one mounting post on a bottom side surface of the backing plate to secure the appliqué to the engine cover.

2. The apparatus of claim 1 wherein the fastener is integrally formed to the backing plate.

3. The apparatus of claim 1 wherein the fastener is inserted over the at least one mount post to secure the appliqué to the engine cover.

4. The apparatus of claim 1 wherein the at least one mounting post is integrally formed to a bottom surface of the appliqué.

5. The apparatus of claim 1 wherein the at least one mounting post is secured to a bottom surface of the appliqué.

6. The apparatus of claim 1 wherein the fastener includes a palnut.

7. The apparatus of claim 1 wherein the fastener includes a threaded fastener.

8. The apparatus of claim 1 wherein the fastener includes a c-clip.

9. The apparatus of claim 1 wherein the appliqué is contoured to a same contour as the top surface of the engine cover.

10. The apparatus of claim 1 wherein the backing plate is contoured to a same contour as the bottom surface of the engine cover.

11. The apparatus of claim 1 wherein the appliqué includes at least one letter.

12. The apparatus of claim 1 wherein the appliqué includes at least one number.

13. The apparatus of claim 1 wherein the appliqué includes at least one word.

14. The apparatus of claim 1 wherein the appliqué includes at least one artistic impression.

15. The apparatus of claim 1 wherein the appliqué includes an embossed emblem.

16. The apparatus of claim 1 wherein the engine cover includes a soft engine cover.

17. The apparatus of claim 16 wherein the backing plate provides structural support for the engine cover.

18. An apparatus comprising:
- a foam engine cover comprising a plurality of holes extending from a top surface to a bottom surface;
- a decorative appliqué mounted on the engine cover comprising a plurality of mounting posts each extending through a respective hole;
- a backing plate supporting the engine cover bottom surface and including fasteners each respectively securing a mounting post of the appliqué, wherein the backing plate is adapted to attach to an engine assembly.

* * * * *